D. M. SMYTH.
Feeding-Mechanism for Sewing-Machines.
No. 130,324.                              Patented Aug. 6, 1872.
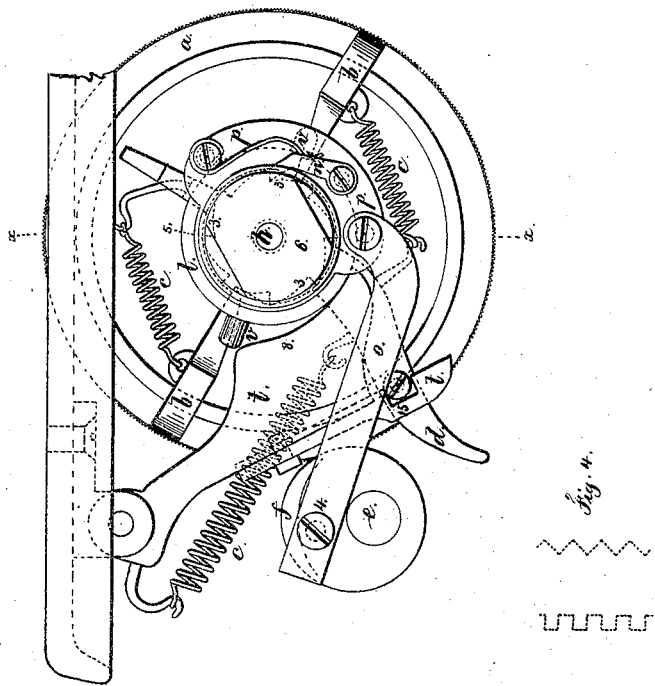
Fig. 1.
Fig. 4.
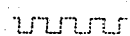
Fig. 3.
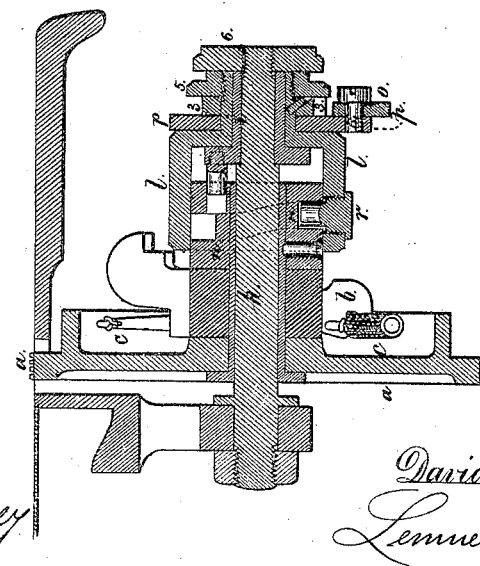
Fig. 2.
Witnesses,
Inventor
David M Smyth
Lemuel W. Serrell
atty

UNITED STATES PATENT OFFICE.

DAVID M. SMYTH, OF ORANGE, NEW JERSEY, ASSIGNOR TO STICKLER, ELLIOTT & WILSON, OF NEW YORK, N. Y.

IMPROVEMENT IN FEEDING MECHANISMS FOR SEWING-MACHINES.

Specification forming part of Letters Patent No. 130,324, dated August 6, 1872.

Specification describing the Improvement in Sewing-Machine Feeds, invented by DAVID M. SMYTH, of Orange, in the county of Essex and State of New Jersey.

This invention is an improvement upon the device patented to me January 9, 1872, No. 122,673, whereby the revolving cam that gives a lateral motion to the sewing-machine feed is applied with a wheel-feed; and, in addition, there is mechanism for locking out of action the ordinary longitudinal feed-movement of the wheel, so that the lateral movement only will be operative for a given number of stitches.

In the drawing, Figure 1 is an elevation of the feeding mechanism, and Fig. 2 is a section at the line $x$ $x$.

$a$ is the feed-wheel, with its clamps $b$, spring $c$, and actuating-lever $d$, all of any usual character; and $e$ is the revolving shaft, with the cam $f$, that gives motion to the feed-lever $d$. The link $o$, from the crank-pin 4 to the oscillating pawl-plate $p$, and pawl $n'$ are similar to those in the aforesaid patent, and act upon the teeth 3 of the cylinder $l$, and rotate the same, progressively, one complete revolution while the sewing mechanism makes a given number of stitches. There is a tubular bearing at one end of the cylinder $l$ for the pawl-plate $p$, and the ratchet-wheel 3 is secured by a nut, 5. This cylinder $l$ is mounted upon the sleeve $i$ that is upon the fixed gudgeon $h$, and confined thereto between a shoulder and the nut 6. The feed-wheel has a tubular bearing around $h$, and upon this the cylinder or grooved cam $n$ is attached or made as one piece. This cam $n$ is made as a groove in a cylinder, and the cylinder is within the cylinder $l$; and there is opportunity for the cam $n$ to slide with the feed-wheel in the line of the axis of such feed-wheel and within the cylinder $l$ when there is a lateral movement given to the feed-wheel by the screw $r$, that passes through $l$, and the end is within the cam-groove of $n$.

It will now be understood that as the cylinder $l$ is revolved progressively it will give a lateral feed by the movement of the wheel $a$ endwise of its axis, and according to the shape of the groove in $n$, so the line of stitching will be more or less zigzag or waving.

The before-mentioned parts may be used alone in performing ornamental sewing in zigzag or waving lines; but when it is necessary to arrest the ordinary longitudinal feed-movement during a certain number of stitches, while the lateral feed only is operative, then I make use of the locking-lever $t$, that is made with a latch at 15 that holds the stud of the feeding-lever $d$ in such a position that the cam $f$ does not act upon said lever $d$; hence the feed-wheel will not be rotated upon its axis until one of the cams or projections $v$ upon the cylinder $l$ presses back the lever $t$, moving and holding the latch 15 out of contact with the stud of the lever $d$; and the projection $v$, or the arc 8 upon the lever $t$, is of the length required to keep the latch 15 out of action while the desired number of stitches are being taken and the feed-wheel is moving the fabric longitudinally.

Figs. 3 and 4 illustrate some of the characters of stitching that can be done by this machine.

In place of revolving the cylinder $l$ by a ratchet-wheel and pawl, a pinion might be employed, and act continuously to rotate the cylinder $l$; and I remark that the screw $r$ may be withdrawn to throw out the laterally-operative parts when the machine is used for straight sewing.

I claim as my invention—

1. The cam $n$ connected with the feed-wheel, in combination with the cylinder $l$ and the respective actuating mechanisms for revolving the cylinder $l$ and for turning the feed-wheel, substantially as set forth.

2. The locking-lever $t$, in combination with the feeding-wheel, the cam $n$, and the mechanisms, substantially as specified, for giving a lateral movement periodically to the feed-wheel while its rotation is suspended, substantially as set forth.

Signed by me this 2d day of July, A. D. 1872.
       D. M. SMYTH.

Witnesses:
 NATHAN M. HAWKES,
 SAML. A. JOHNSON.